Figure 1:
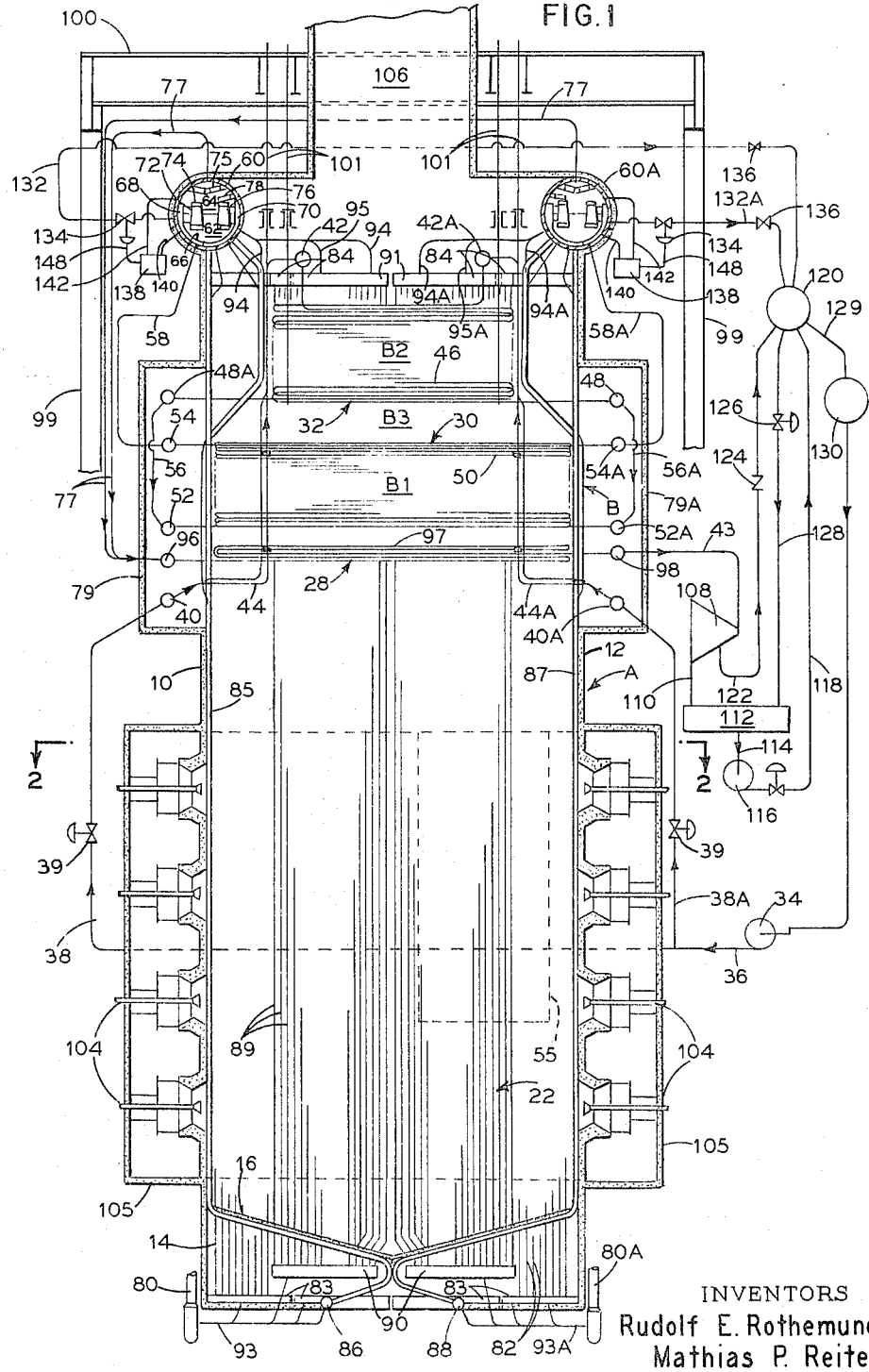

Dec. 6, 1966   R. E. ROTHEMUND ETAL   3,289,643
VAPOR GENERATOR

Filed Dec. 9, 1963   3 Sheets-Sheet 3

United States Patent Office 3,289,643
Patented Dec. 6, 1966

3,289,643
VAPOR GENERATOR
Rudolf E. Rothemund, Wadsworth, Ohio, Mathias P. Reiter, Park Forest, Ill., and William H. Wilcoxson, Wadsworth, Ohio, assignors to The Babcock & Wilcox Company, New York, N.Y., a corporation of New Jersey
Filed Dec. 9, 1963, Ser. No. 328,830
11 Claims. (Cl. 122—406)

This invention relates in general to the construction and operation of vapor generators and more particularly to improvements in the construction and operation of water-tube boilers especially adapted for peaking service.

The specific methods of meeting the variable load problem are irrevocably involved with the financial or economic aspect of energy production, for the peaks add but little to the gross income of the plant and may actually detract from the net. By definition, a peaking unit is one that operates for short periods of time during system peaks, and generates relatively few kilowatt-hours. Therefore, fixed charges on investment are a major item of the cost per unit of power and the cost of fuel is a minor item. The methods of carrying peak loads which have been tried include a hydro system which pumps water into a reservoir with off-peak power to produce, later, on-peak power. In this system a centrifugal pump, a hydraulic turbine, and a motor-generator are mounted on the same shaft. Although the system of pumped storage hydro power generation has been successfully tried, it has several drawbacks including high capital cost and a capacity for power generation limited by the storage capacity of the reservoir and by the availability of thermal capacity to provide the power necessary to charge the system.

While the vapor generators of the invention is capable of continuous use in vapor power plants, particularly during system or natural emergencies, it is especially intended and adapted to carry peak loads only and to be competitive with pumped storage hydro power systems. Thus the general object of the present invention is the provision of a vapor generator possessing the virtues of relatively low capital cost, about one-half of that of pumped hydro power systems of corresponding capacity, relatively low total generating cost for peak power, and a capacity for power generation limited only by its rating. A further and more specific object of the invention is the provision of a vapor generating unit of the type described which is characterized by an arrangement of fuel burning equipment and a furnace construction permitting the burning of a fluid fuel at high rates of heat release per cubic foot of furnace volume; an arrangement of fluid heating surface in the furnace increasing the effectiveness of the furnace without increasing its volume or outside space requirements; its ability to deliver a uniform vapor temperature over a wide load range, to be placed into service from a hot bank condition in a matter of minutes, and to respond to wide and frequent load swings; a straight up gas flow path, requiring a minimum of flues and ducts; and economizer surface so constructed and arranged relative to the gas flow path as to produce a major portion of the vapor generated by the unit.

In accordance with the invention the vapor generating unit has a natural circulation fluid circulation system and comprises walls including vapor generating tubes forming an upright furnace chamber and an upright convection gas cooling chamber overlying the furnace chamber, with the convection gas cooling chamber having a lower portion of substantially uniform horizontal cross-sectional area throughout its height, an upper portion having a horizontal cross-sectional area substantially smaller than that of the lower portion, and an intermediate portion of continuously decreasing horizontal cross-sectional area in the direction of the upper portion opening at its opposite ends to the upper and lower portions. The convection gas cooling chamber is occupied by economizer surface and a superheater disposed upstream gas-wise of the economizer, with the economizer being proportioned and arranged to provide a major portion of the vapor generated by the unit and being connected for parallel flow of liquid to a pair of vapor and water drums disposed on opposite sides of and adjacent the gas discharge end of the convection gas cooling chamber, and with the superheater being connected for parallel flow of fluid from the drums. Some of the vapor generating tubes of the unit are constructed and arranged to support the weight of the superheater and a portion of the weight of the economizer. Another feature of the invention is the provision of a by-pass system for relieving drum water swell, resulting from a sudden change in load, to prevent overheating of economizer tubes and priming.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 2:
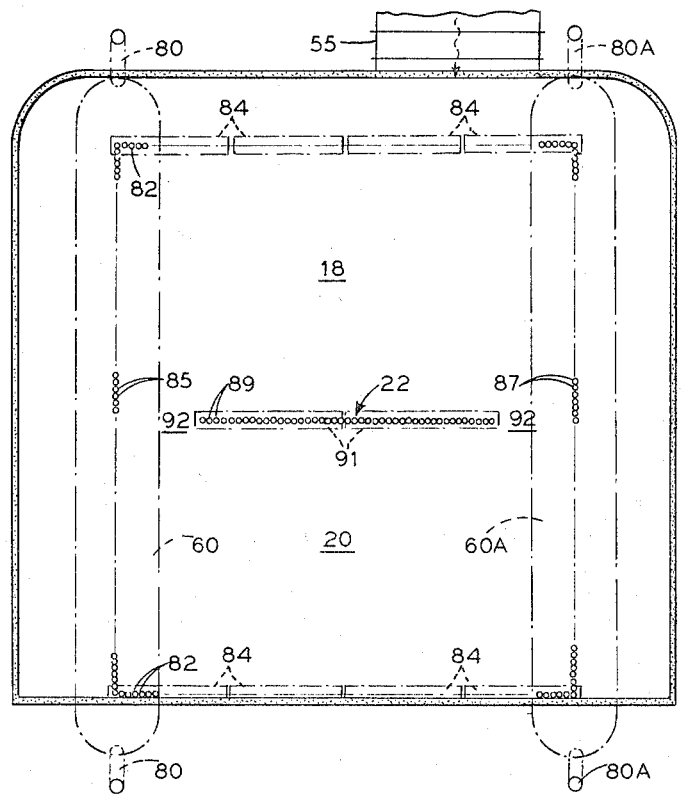
Figure 5:
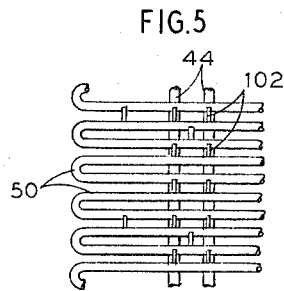
Figure 6:
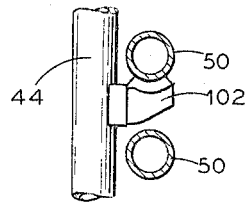
Figure 7:
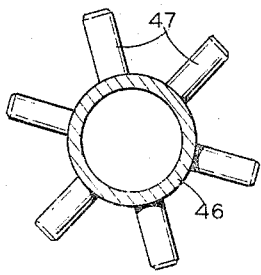
Figure 4:
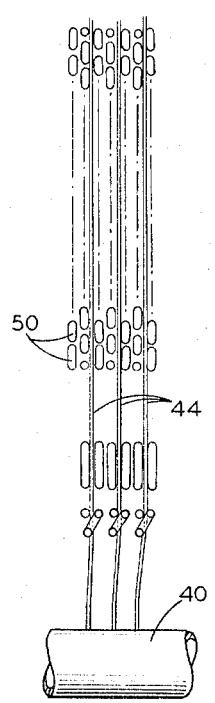
Figure 3:
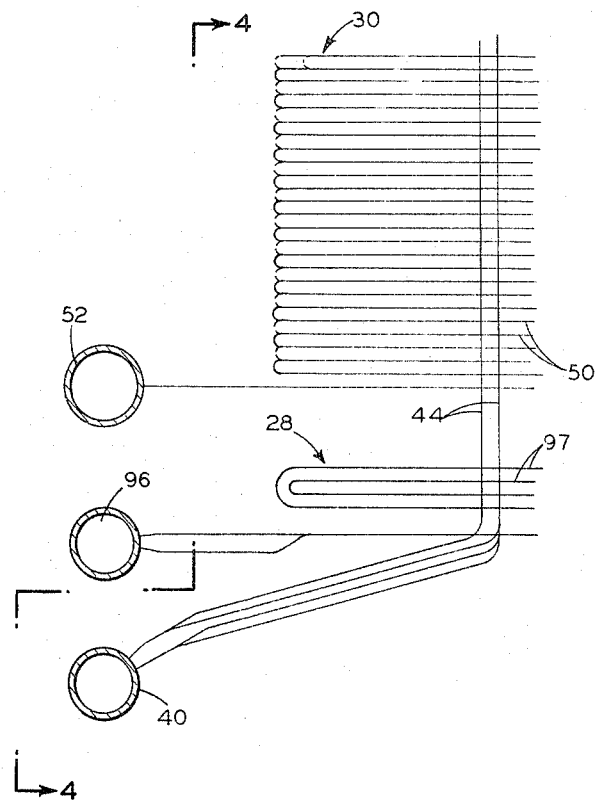

In the drawings:
FIG. 1 is a vertical section of a steam generating plant constructed in accordance with the invention;
FIG. 2 is a sectional plan view taken along line 2—2 of FIG. 1;
FIG. 3 is an enlarged view of a portion of the structure illustrated in FIG. 1;
FIG. 4 is a sectional view taken along line 4—4 of FIG. 3;
FIG. 5 is an enlarged view of a portion of the structure illustrated in FIG. 3;
FIG. 6 is an enlarged view of one of the economizer support lugs; and
FIG. 7 is an enlarged sectional view of one of the tubes of the extended surface economizer shown in FIG. 1.

In the drawings the invention has been illustrated as embodied in a top-supported natural circulation vapor generating unit intended primarily for central station use as reserve capacity in readiness on hot bank to meet peak load demands, and designed principally for oil, gas, or combination firing and for furnace operation under internal gaseous pressures above atmospheric pressure. The particular unit illustrated is designed on oil firing for a maximum continuous vapor output of 2,150,000 lbs. of vapor per hour at a pressure of 1550 p.s.i.g. and a total temperature of 850° F. at the superheater outlet, based on feed water being supplied at a temperature of 230° F.

The main portions of the unit illustrated in FIGS. 1 and 2 include a vertically elongated setting of substantially rectangular horizontal cross-section having a lower furnace chamber portion A and an upper convection gas cooling chamber B and formed by vertically extending front, rear, and opposing side walls 10, 12 and 14, respectively, and a floor 16 having oppositely inclined portions converging downwardly from the lower ends of the front and rear walls 10 and 12, respectively. The furnace A is divided into a pair of compartments 18 and 20 by a vertical partition wall 22 extending normal to walls 10 and 12, with the upper portion of wall 22 also dividing chamber B into a pair of parallel heating passes or sections respectively forming continuations of compartments 18 and 20. Chamber B includes a lower portion B1 of substantially uniform horizontal cross-sectional area throughout its height with its horizontal cross-sectional area being the same as that of the adjacent furnace chamber A, an upper portion B2 of substantially uniform cross-sectional area throughout its height with its horizontal cross-sectional area being substantially smaller than that of portion B1 to provide high gas velocities, and an intermediate portion B3 of gradually decreasing horizontal cross-sectional area in the direction of gas flow opening at its opposite ends to portions B1 and B2.

Portion B1 of chamber B is occupied by a superheater 28 and a bare tube type economizer 30 disposed downstream gas flow-wise of superheater 28, while the gas discharge end of chamber portion B3 and most of chamber portion B2 are occupied by an extended surface type economizer 32.

Feedwater at high pressure is supplied by a feed pump 34 through a conduit 36 and a pair of parallel flow branch conduits 38, 38A to a pair of horizontal economizer supply headers 40, 40A disposed at a common elevation outside front wall 10 and rear wall 12, respectively, at a position subjacent the gas inlet of chamber B. Each of the conduits 38, 38A contains a feedwater control valve 39. Header 40 is connected for supply of fluid to a horizontal economizer inlet header 42 by a row of tubes 44, while header 40A is connected for supply of fluid to a horizontal economizer inlet header 42A by a row of tubes 44A. Tubes 44 and 44A serve as support tubes, as hereinafter described, as well as supply tubes, and respectively extend horizontally through the walls 10 and 12 in sealing relation therewith, and then vertically upward through chamber B for connection to the inlet headers of economizer 32.

Economizer 32 comprises horizontally extending vertically spaced multi-looped tubes 46 formed with radially extending studs 47, as shown in FIG. 7, and arranged in laterally spaced vertically disposed panels to define paralel flow paths for fluid flow in counter flow heat transfer relation with the gases flowing through portion B2 of gas flow chamber B, with the tubes of alternate panels being arranged in staggered relation with the tubes of the next adjacent remaining panels. Tubes of alternate panels have their inlet ends connected to header 42 and their outlet ends connected to a horizontal header 48, while the tubes of the remaining panels have their inlet ends connected to header 42A and their outlet ends connected to a horizontal header 48A.

Economizer 30 comprises horizontally extending vertically spaced multi-looped bare tubes 50 arranged in laterally spaced vertically extending panels to define parallel flow paths for fluid flow in parallel flow heat transfer relation with the gases flowing through portion B1 of chamber B. Tubes of alternate panels have their inlet and outlet ends connected to horizontal headers 52 and 54, respectively, and the tubes of the remaining panels have their inlet and outlet ends connected to horizontal headers 52A and 54A, respectively. Header 52 is connected for supply of fluid from header 48A by conduits 56 and header 52A is connected for supply of fluid from header 48 by conduits 56A.

Header 54 is connected by tubes 58 for flow of fluid to a horizontal upper steam and water drum 60 having its vertical longitudinal axis in the same vertical plane as front wall 10, while header 54A is connected by tubes 58A for flow of fluid to a horizontal upper steam and water drum 60A having its vertical longitudinal axis in the same vertical plane as rear wall 12. Drums 60 and 60A are disposed at a common elevation in parallel relation on opposite sides of and adjacent the gas discharge end of chamber B.

Each of the drums 60 and 60A have lower water space 62 and an upper vapor space 64 and is partitioned by plates 66 into a compartment 68 arranged to receive fluid discharging from economizer 30 and a compartment 70 arranged to receive fluid discharging from the vapor generating circuitry of the boundary walls of the furnace A and chamber B, which will be hereinafter described. The platework forming compartment 68 is provided with outputs to which are connected cyclone type vapor and water separators 72 adapted to whirl the fluid outflow from compartment 68 to provide a centrifugal separation of vapor and steam, with the separated water discharging into water space 62 and separated vapor passing upwardly through corrugated plate scrubbers 74 to the vapor space 64. Similarly, the platework forming compartment 70 is provided with outlets to which are connected cyclone type vapor and water separators 76 arranged to receive the vapor and water mixtures discharging from compartment 70 and to discharge separated water into water space 62 and separated vapor through scrubbers 78 to vapor space 64. The separated vapor passing to vapor space 64 of each of the drums 60, 60A is subjected to a further separation in a twin arrangement of corrugated plate scrubbers 75 before passing out through discharge tubes 77 to the superheater 28. The vapor generating circuitry of the boundary walls of the furnace A and gas flow chamber B are supplied with fluid by a pair of downcomers 80 extending downwardly from opposite ends of drum 60 and connected to the water space 62 thereof and by a pair of downcomers 80A extending downwardly from opposite ends of drum 60A and connected to the water space 62 thereof.

Each of the boundary walls of the furnace A and gas flow chamber B is lined or formed by a row of upwardly extending parallel flow tubes having their intertube spaces closed along most of their lengths by metallic webs welded to adjacent tubes to provide a gas-tight construction and arranged in groups to form parallel flow tube panels. Thus each side wall 14 is formed by a row of upright tubes 82 on opposite sides of the vertical centerline of the wall and extending between a corresponding number of horizontal lower and upper headers 83 and 84. Front wall 10 and one half of floor 16 are formed by a row of tubes 85 arranged in groups to form tube panels having their inlet ends connected to a corresponding number of horizontal lower headers 86 and their outlet ends connected to drum 60 and opening to compartment 70 thereof. The other half of floor 16 and rear wall 12 are formed by a row of tubes 87 arranged in groups to form tube panels having their inlet ends connected to a corresponding number of horizontal lower headers 88 and their outlet ends connected to drum 60A and opening to compartment 70 thereof. Upper portions of alternate tubes of both the front wall 10 and rear wall 12 are outwardly offset from the plane of the corresponding wall to form, along with the remaining tubes of the corresponding wall and tube panels of the side walls, portion B1 of chamber B; then incline inwardly and upwardly to form, together with tube panels of the side walls, portion B3 of chamber B; then extend vertically upward to form, in cooperation with side wall tube panels, portion B2 of chamber B; then incline outwardly and upwardly for connection to the corresponding steam and water drum. The corresponding upper portions of the remaining tubes of both the front and rear walls extend vertically upward in the plane of the corresponding wall for connection to the corresponding steam and water drum. Intermediate portions of some of the tubes of front and rear walls in the furnace are suitably bent to form the openings or ports for the burners. The portions of the tubes 85 and 87 forming furnace chamber A have their intertube spaces closed by metallic webs welded to adjacent tubes up to a position subjacent the superheater 28, and their floor portions covered by refractory, while the remaining or upper portions of tubes 85 and 87 forming gas flow chamber B have their intertube spaces closed by refractory covered flat studs. Tubes 82 of each side wall have their intertube spaces closed by metallic webs throughout their lengths.

Partition wall 22 is formed by a row of contiguous vertically extending parrallel tubes 89 arranged in groups to form a pair of coplanar tube panels extending between a corresponding number of lower and upper headers 90 and 91, respectively. The large amount of fluid heating surface in the partition wall 22 increases the effectiveness of the furnace without increasing its volume or its outside space requirements. The outermost vertical edges of the panels are spaced from the adjacent boundary walls of the furnace A and gas flow chamber B to provide openings 92 for the flow of gases between compartments 18 and 20 of furnace A and the corresponding passes of chamber B.

The boundary and division wall fluid flow circuitry above described is connected into the natural circulation fluid circuation of the unit by various supply and riser tubes. Thus, downcomers 80 have their lower ends connected by tubes 93 for supply of fluid to headers 86, headers 83 on the adjacent side of the vertical centerline of each side wall 14, and header 90 of the adjacent division wall tube panels. Likewise, downcomers 80A have their lower ends connected by tubes 93A for supply of fluid to headers 83, headers 83 on the adjacent side of the vertical centerline of each side wall 14, and header 90 of the adjacent division wall tube panels. Headers 84 on one side of the vertical centerline of each side wall are connected by riser tubes 94 for discharge of fluid to compartment 70 of drum 60, while headers 84 on the opposite side of the vertical centerline of each side wall are connected by riser tubes 94A for discharge of fluid to compartment 70 of drum 60A. One of headers 91 is connected for fluid discharge to compartment 70 of adjacent drums 60 by riser tubes 95, while the other header 91 is connected for discharge to compartment 70 of adjacent drum 60A by riser tubes 95A. The steam separated in drums 60, 60A passes through tubes 77 to a horizontal superheater inlet header 96.

Superheater 28 comprises pendantly-supported horizontally extending vertically spaced multi-looped drainable tubes 97 arranged in laterally spaced vertically disposed panels to define parallel flow paths for vapor flow between header 96 and a horizontal outlet header 98, with the tubes being arranged so that vapor flows first in parallel flow heat transfer relation with the gases and then in counterflow heat transfer relation, and with the last horizontal tube run, with respect to vapor flow, of each panel being disposed in the middle of the corresponding panel to minimize tube metal alloy requirements.

Headers 40, 96, 52, 54 and 48A are successively arranged one above another, extend parallel to and are disposed outside of front wall 10, and are enclosed by a housing 79 connected to front wall 10; while headers 40A, 98, 52A, 54A, and 48 are successively arranged one above another, extend parallel to and are disposed outside of rear wall 12, and are enclosed by a housing 79A connected to rear wall 12.

The steam generator setting is top-supported by structural steel members including upright members 99 and cross beams 100 from which hangers 101, of which only a few are illustrated, support all walls, the steam and water drums, and the economizer and superheater surfaces.

More particularly and with reference to FIGS. 3–6, the tubes of superheater 28 and economizer 30 are supported by lugs 102 welded to the upright portions of tubes 44 and 44A at vertically spaced positions therealong, with the upright portions of tubes 44 and 44A being positioned between the tube panels of superheater 28 and economizer 30 and top-supported by some of the hangers 101. Each of the lugs 102 has a recessed portion adapted to receive a tube and cooperates with the other lugs to restrain lateral and vertical movements of the tubes, while permitting longitudinal movement thereof.

Fluid-cooled furnace A is especially intended for the burning of a fluid fuel at extremely high rates of heat release. To this end the lower and intermediate portions of compartments 18 and 20 of furnace A are fired by horizontally extending burners 104 arranged to direct fuel and air under pressure in mixing relationship into the compartments through corresponding burner ports formed in front wall 10 and rear wall 12. The front and rear walls of the furnace each include four vertically spaced rows of burners, each row having two burners. Air is supplied to the burners by a forced draft fan, not shown, which passes air under pressure through ductwork 55 to a vertically extending windbox 105 enclosing the burners 104 and the lower and intermediate portions of the front and rear boundary walls of furnace A. The burners and furnace are proportioned and arranged to provide minimum burner clearances for prevention of flame impingement on the partition and boundary walls of the furnace and to afford a flow path of sufficient length to insure complete combustion.

The heating gases resulting from the combustion of the fuel and air introduced into the furance flow upwardly through the compartments 18 and 20 and corresponding heating passes of chamber B, while successively contacting and passing over the tubes of superheater 28, economizer 30 and ecomonizer 32, and then parallel flow gas streams combine for flow through a gas outlet 106 to another heat trap, if desired, or to the stack. Gas outlet 106 is disposed intermediate drums 60 and 60A and is formed by ductwork connected to the drums. The temperature of the heating gases flowing through chamber B is regulated to provide a gas temperature at the entrance of chamber B of a degree which will avoid overheating of the superheater 28, and yet provide a heat content of the gases sufficient to attain a substantially constant vapor temperature leaving the superheater over a wide range of loads. For this purpose the supply of combustion air to the furnace is suitably controlled to provide heating gases having a heat content sufficient to provide a substantially constant final vapor temperature throughout the load range.

With the boiler construction described and with reference to FIG. 1, subcooled feedwater discharges from pump 34 through conduit 36 and parallel flow conduits 38 to headers 40 and 40A, then flows upwardly in parallel through support tubes 44 and 44A to economizer inlet headers 42 and 42A then passes downwardly in parallel through the tube panels of economizer 32, then flows upwardly in parallel through the tube panels of economizer 30 to outlet headers 54 and 54A, and then passed in parallel to compartment 68 of drums 60 and 60A. The economizer heating surface and the heating surfaces of the boundary walls of the furnace A and gas flow chamber B are proportioned and arranged so that at maximum load the transition of the working medium from a water condition to a steam-water condition will occur in the economizer 30 and so that 63% of the steam generated is made in the economizer 30.

The vapor and water mixtures generated in the economizer 30 discharge to compartment 68 of drums 60 and 60A and then tangentially enter the whirl chambers of separators 72 of the corresponding drum, with separated vapor passing upwardly to vapor space 64 of the corresponding drum and separated water passing downwardly to water space 62 of the corresponding drum. Separated water thus supplied to water space 62 of drum 60 and 60A flows downwardly through downcomers 80 and 80A.

As previously described, tubes 85 of the front wall tube panels and tubes 89 and 82 of one half of the tube panels of the partition wall 22 and each side wall 14 are connected for parallel supply of fluid from downcomers 80 and for discharge of vapor-liquid mixtures to compartment 70 of drum 60; while tubes 87 of the rear wall tube panels and tubes 89 and 82 of the other half of the tube panels of the partition wall 22 and each side wall 14 are connected for parallel supply of fluid from downcomers 80A and for discharge of vapor-liquid mixtures to compartment 70 of drum 60A. Vapor and water mixtures received by compartment 70 of drums 60 and 60A longitudinally enter the whirl chambers of separators 76 of the corresponding drum, with separated water passing downwardly to water space 62 of the corresponding drum for end flow, along with the separated water discharging from separators 72, to the downcomers 80 in the case of drum 60 and downcomers 80A in the case of drum 60A, and with separated vapor passing upwardly to vapor space 64 for flow, along with the separated steam discharging from separators 72, through corresponding scrubbers 75 and tubes 77 to the superheater 28. The vapor then passes through the tubes of superheater 28 and a conduit 43 to the point of use.

From the above description it is evident that the unit embodies two identical and separate natural circulation circuits, one comprising drum 60, downcomers 80 and parallel flow tubes of the front wall tube panels, and half of the tube panels of the partition wall and each side wall, and the other comprising drum 60A, downcomers 80A and parallel flow tubes of the rear wall tube panels and the other half of the tube panels of the partition wall and each side wall. The unit also embodies two identical fluid supply circuits for the drums 60, 60A, one circuit including conduit 38, tubes 44, tubes of alternate panels of economizer 32, conduits 56A, tubes of alternate panels of economizer 30, and tubes 58A, with supply of fluid to this circuit being regulated by valve 39 in corresponding conduit 38; and the other circuit including conduit 38A, tubes 44A, tubes of the remaining panels of economizer 32, conduits 56, tubes of the remaining panels of economizer 30, and tubes 58, with supply of fluid to this circuit being regulated by valve 39 in corresponding conduit 38A. This circuitry construction and arrangement minimizes the possibility of upset conditions occurring between the two drums.

While the vapor generating construction illustrated and above described may be continuously operated during off-peak hours, the unit is specifically designed and particularly adapted to carry peak loads and to be maintained in a live or hot bank condition during off-peak hours. By live bank it is meant that the vapor generating unit is operated at combustion rates just sufficient to maintain normal operating pressure under conditions of no load demand. With the unit in a live bank condition, full vapor generating capacity can be reached in less than thirty minutes when the unit is required to carry peak loads. In normal operation the superheated vapor outflow of superheater 28 passes through conduit 43 to a high pressure vapor turbine 108 for expansion therein, and then exhausts through a conduit 110 to a main condenser 112 where it is condensed at a low pressure for return to the feedwater system. From the condenser 112 the condensate passes by way of a conduit 114 to a pump 116 from which it discharges through a conduit 118 to a direct contact type deaerating heater 120 which serves to boil the condensate to eliminate any entrained oxygen. Vapor extracted from the turbine, by way of a conduit 122 having a check valve 124, supplies the heat required to raise to the boiling point the temperature of the condensate entering the deaerator. If the pressure in the deaerator becomes greater than the pressure in the extraction conduit 122, check valve 124 automatically closes, thereby preventing backflow to the turbine. In the event the pressure in the deaerator rises above a predetermined valve, a valve 126, contained in a conduit 128 connecting the deaerator 120 to condenser 112, automatically opens to permit flow from the deaerator to the condenser until the deaerator pressure is reduced to the predetermined value. Condensate from the deaerator passes through a conduit 129 to a storage tank 130 from which it flows to the suction side of feed pump 34 for return to the vapor generator.

The flow of feedwater to the vapor generating unit is regulated in proportion to the flow of vapor therefrom. The change of drum swell, resulting from a sudden change in vapor demand, affects the water level extensively. Actually, swell produces an increase of level with an increase in vapor flow. This results in initial reverse operation of feedwater supply, the water supply being temporarily reduced, rather than increased. The opposite effect occurs with a vapor flow decrease. Reverse operation of feedwater supply even for a short time during periods of sudden increase in load demand can lead to overheating of the high heat input economizer surface. Swelling of the water can also produce priming, that is, the discharge from the vapor and water drums to the superheater of vapor containing excessive quantities of water in suspension. These problems are overcome, in accordance with the invention, by special provisions for assuring an adequate flow of fluid through the economizer surface under all conditions of boiler loading, especially during sudden load changes, and for preventing priming induced by swelling of the water in the vapor and water drums as a result of sudden changes in pressure or load, particularly when the rate of vapor output is rapidly increased from a hot bank condition. These provisions include a pair of by-pass conduits 132, 132A respectively connecting the water space 62 of drums 60 and 60A to deaerator 120 and each containing a water level control valve 134 and a pressure reducing valve 136. As an alternative, conduits 132 and 132A can be connected for direct discharge to condenser 112. With normal drum water level each of the valves 134 is at its fully closed position. A water level indicating transmitter 138 is connected to each of the drums by conduits 140 and 142 respectively leading from the water space 62 and vapor space 64 of the corresponding drum and providing a measure of the water level to the transmitter which translates any deviation from some pre-set minimum value of water level above normal water level into an impulse force change, which is transmitted to corresponding control valve 134 by way of line 148 to move the valve in an opening direction to permit flow of water from the corresponding drum to the deaerator, with each transmitter being set so that the corresponding control valve gradually moves to its full open position as the water level increases to some predetermined maximum value above normal water level. As the drum water level decreases due to flow through its corresponding by-pass conduit, corresponding valve 134 moves towards its closed position. Due to the high pressure difference between the inlet and discharge side of each valve 136 a portion of the water passing through the corresponding by-pass conduit flashes into vapor which is condensed in the deaerator. Conduits 132 and 132A along with their associated drums and control and pressure reducing valves, operate independently of each other. With the by-pass system so constructed and arranged, swelling of the drum water is relieved, thereby inhibiting priming and offsetting the aforesaid reverse operation of feedwater supply occasioned by water swell to the extent that the supply to the economizer is at all times sufficient to prevent overheating.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. A vapor generator having a natural circulation fluid circulation system and comprising walls including vapor generating tubes forming an upright furnace chamber and an upright convection gas cooling chamber overlying said furnace chamber, said gas cooling chamber having a lower portion of substantially uniform horizontal cross-sectional area throughout its height, an upper portion having a horizontal cross-sectional area substantially smaller than that of the lower portion, and an intermediate portion of continuously decreasing horizontal cross-sectional area in the direction of said upper portion opening at its opposite ends to said lower and upper portions, a pair of vapor and water drums disposed on opposite sides of and adjacent said gas cooling chamber, an integral economizer connected for parallel flow of fluid to said drums and having one section in said upper portion of the gas cooling chamber and another section in said lower portion of the gas cooling chamber, a superheater in said gas cooling chamber disposed upstream gas-wise of said economizer and connected for parallel flow of fluid from said drums, means supplying high temperature heating gases to said furnace, and means connecting the vapor generating tubes into said fluid circulation system for fluid flow to and from said drums.

2. A vapor generating unit having a natural circulation fluid circulation system and comprising walls including vapor generating tubes forming an upright furnace chamber and an upright convection gas cooling chamber overlying said furnace chamber, said gas cooling chamber having a lower portion of substantially uniform horizontal cross-sectional area throughout its height, an upper portion having a horizontal cross-sectional area substantially smaller than that of the lower portion, and an intermediate portion of continuously decreasing horizontal cross-sectional area in the direction of said upper portion opening at its opposite ends to said lower and upper portions, a pair of vapor and water drums disposed on opposite sides of and adjacent said gas cooling chamber, an integral economizer connected for parallel flow of fluid to said drums and proportioned and arranged to provide a major portion of the vapor generated by said unit and having one section in said upper portion of the gas cooling chamber and another section in said lower portion of the gas cooling chamber, a superheater in said gas cooling chamber disposed upstream gas-wise of said economizer and connected for parallel flow of fluid from said drums, means supplying high temperature heating gases to said furnace, and means for connecting the vapor generating tubes into said fluid circulation system for fluid flow to and from said drums.

3. A vapor generator having a natural circulation fluid circulation system and comprising walls including vapor generating tubes forming an upright furnace chamber and an upright convection gas cooling chamber overlying said furnace chamber, said gas cooling chamber having a lower portion of substantially uniform horizontal cross-sectional area throughout its height, an upper portion having a horizontal cross-sectional area substantially smaller than that of the lower portion, and an intermediate portion of continuously decreasing horizontal cross-sectional area in the direction of said upper portion opening at its opposite ends to said lower and upper portions, a pair of vapor and water drums disposed on opposite sides of and adjacent said gas cooling chamber, an integral economizer including an extended surface type economizer section disposed in the upper portion of said gas cooling chamber, and a bare tube type economizer section disposed in the lower portion of said gas cooling chamber and connected for series flow of fluid from said extended surface economizer section and for parallel flow of fluid to said vapor and water drums, a superheater in the lower portion of said gas cooling chamber disposed upstream gas-wise of said bare tube economizer section and connected for parallel flow of fluid from said drums, means supplying high temperature heating gases to said furnace, and means connecting the vapor generating tubes into said fluid circulation system for fluid flow to and from said drums.

4. A vapor generator having a natural circulation fluid circulation system and comprising walls including vapor generating tubes forming an upright furnace chamber and an upright convection gas cooling chamber overlying said furnace chamber, said gas cooling chamber having a lower portion of substantially uniform horizontal cross-sectional area throughout its height, an upper portion having a horizontal cross-sectional area substantially smaller than that of the lower portion and an intermediate portion of continuously decreasing horizontal cross-sectional area in the direction of said upper portion opening at its opposite ends to said lower and upper portions, a pair of vapor and water drums disposed on opposite sides of and adjacent said gas cooling chamber, means including a row of vapor generating tubes dividing said furnace chamber into a pair of gas flow compartments and said gas cooling chamber into a pair of parallel flow gas passes opening to said compartments, an integral economizer disposed in the parallel flow gas passes of said gas cooling chamber and connected for parallel flow of fluid to said vapor and water drums, a superheater in the parallel flow gas passes of said gas cooling chamber disposed upstream gas-wise of said economizer and connected for paralel flow of fluid from said drums, means supplying high temperature heating gases to said furnace, and means for connecting the vapor generating tubes into said fluid circulation system for fluid flow to and from said drums.

5. A vapor generator having a natural circulation fluid circulation system and comprising walls including vapor generating tubes forming an upright furnace chamber and an upright convection gas cooling chamber overlying said furnace chamber, a pair of vapor and water drums disposed on opposite sides of and adjacent said gas cooling chamber, an economizer in said gas cooling chamber connected for parallel flow of fluid to said vapor and water drums and comprising a plurality of horizontally spaced tube panels arranged in vertical planes, a superheater in said gas cooling chamber disposed upstream gas-wise of said economizer and connected for parallel flow of fluid from said drums and comprising a plurality of horizontally spaced tube panels arranged in vertical planes, a plurality of superheater and economizer support tubes connected for supply of fluid to said economizer and positioned between and extending across adjacent panels of said superheater and adjacent panels of said economizer, means for supporting said economizer and superheater tube panels at vertically spaced positions along said support tubes, said last named means including lugs secured to said support tubes and each having a recess adapted to carry a tube, with the lugs cooperating to restrain lateral and vertical movements of the economizer and superheater tubes while permitting sliding longitudinal movement thereof, means supplying high temperature heating gases to said furnace, and means for connecting the vapor generating tubes into said fluid circulation system for fluid flow to and from said drums.

6. A vapor generator having a natural circulation fluid circulation system and comprising walls including vapor generating tubes forming an upright furnace chamber and an upright convection gas cooling chamber overlying said furnace chamber, said gas cooling chamber having a lower portion of substantially uniform horizontal cross-sectional area throughout its height, an upper portion having a horizontal cross-sectional area substantially smaller than that of the lower portion, and an intermediate portion of continuously decreasing horizontal cross-sectional area in the direction of said upper portion opening at its opposite ends to said lower and upper portions, a pair of vapor and water drums disposed on opposite sides of and adjacent said gas cooling chamber, an economizer in said gas cooling chamber connected for parallel flow of fluid to said vapor and water drums and comprising a plurality of horizontally spaced tube panels arranged in vertical planes, a superheater in said gas cooling chamber disposed upstream gas-wise of said economizer and connected for parallel flow of fluid from said drum and comprising a plurality of horizontally spaced tube panels arranged in vertical planes, a plurality of superheater and economizer support tubes connected for supply of fluid to said economizer and positioned between and extending across adjacent panels of said superheater and adjacent panels of said economizer, means for supporting said economizer and superheater tube panels at vertically spaced positions along said support tubes, said last named means including lugs secured to said support tubes and each having a recess adapted to carry a tube, with the lugs cooperating to restrain lateral and vertical movements of the economizer and superheater tubes while permitting sliding longitudinal movement thereof, means supplying high temperature heating gases to said furnace, and means for connecting the vapor generating tubes into said fluid circulation system for fluid flow to and from said drums.

7. In a vapor generator having a natural circulation fluid circulation system, a drum connected into said fluid circulation system and having an upper vapor space and a lower water space, means including a feed pump forming a feedwater system for supply of feedwater to said drum in direct proportion to the load demand on the vapor generator, and means inhibiting reduction in feedwater supply from the pump to the drum upon drum swell produced by sudden increase in load demand, said last named means including a conduit opening to and connecting the water space of said drum for flow to the inlet side of said pump, a normally closed valve in said conduit adapted to permit flow through said conduit upon drum swell when the drum water level rises beyond a predetermined value, and means responsive to water level in said drum for moving the valve in an opening direction as the drum water level rises beyond said predetermined value to permit recirculating flow of water from the drum to and through the feed pump back to the drum.

8. In a vapor generator having a natural circulation fluid circulation system, a drum connected into said fluid circulation system and having an upper vapor space and a lower water space, an economizer connected for flow of fluid to said drum, means for passing high temperature heating gases over said economizer, means including a feed pump forming a feedwater system for supply of feedwater to said economizer in direct proportion to the load demand on the vapor generator, and means inhibiting reduction in feedwater supply from the pump to the economizer upon drum swell produced by sudden increase in load demand, said last named means including a conduit opening to and connecting the water space of said drum for flow to the inlet side of said pump, a normally closed valve in said conduit adapted to permit flow through said conduit upon drum swell when the drum water level rises beyond a predetermined value, and means responsive to water level in said drum for moving the valve in an opening direction as the drum water level rises beyond said predetermined value to permit recirculating flow of water from the drum to and through the feed pump and economizer back to the drum.

9. A vapor generator comprising walls including fluid heating tube panel means forming an upright furnace chamber and an upright convection gas cooling chamber overlying said furnace chamber, means supplying high temperature heating gases to the furnace chamber, first and second vapor and water drum means disposed on opposite sides of and adjacent the gas cooling chamber, means forming a pair of natural circulation fluid circulation circuits separate from and independent of each other, one circuit consisting of the first drum means, some of the tube panel means, and means connecting said last named tube panel means for fluid flow to and from the first drum means, the other circuit consisting of the second drum means, others of the tube panel means, and means connecting said last named tube panel means for fluid flow to and from the second drum means, and means forming a fluid supply system for said circuits including means for supplying a vaporizable fluid in parallel flow relation to said first and second drum means.

10. A vapor generator comprising walls including fluid heating tube panels forming an upright furnace chamber and an upright convection gas cooling chamber overlying the furnace chamber, an economizer disposed in the gas cooling chamber and comprising a multiplicity of tube panels, means supplying high temperature heating gases to the furnace chamber, first and second vapor and water drum means disposed on opposite sides of and adjacent the gas cooling chamber, means forming a pair of natural circulation fluid circulation circuit separate from and independent of each other, one circuit consisting of the first drum means, half of the fluid heating tube panels, and means connecting said last named tube panels for fluid flow to and from the first drum means, the other circuit consisting of the second drum means, the remaining fluid heating tube panels, and means connecting said last named tube panels for fluid flow to and from the second drum means, means supplying fluid to the first drum means including alternate tube panels of the economizer, means supplying fluid to the second drum means including the remaining tube panels of the economizer, and means supplying fluid in parallel flow relation to the tube panels of said economizer.

11. A vapor generator comprising walls including fluid heating tube panels forming an upright furnace chamber and an upright convection gas cooling chamber overlying said furnace chamber, a superheater disposed in the gas cooling chamber, an economizer disposed in said gas cooling chamber and comprising a multiplicity of tube panels, means supplying high temperature heating gases to said furnace chamber, first and second vapor and water drum means disposed on opposite sides of and adjacent the gas cooling chamber, means forming a pair of natural circulation fluid circulation circuits separate from and independent of each other, one circuit consisting of the first drum means, half of the fluid heating tube panels, and means connecting said last named tube panels for fluid flow to and from the first drum means, the other circuit consisting of the second drum means, the remaining fluid heating tube panels, and means connecting said last named tube panels for fluid flow to and from the second drum means, means supplying fluid to the first drum means including alternate tube panels of the economizer, means supplying fluid to the second drum means including the remaining tube panels of the economizer, means supplying fluid in parallel flow relation to the tube panels of the economizer, and means connecting the superheater for parallel flow of vapor from said first and second drum means.

References Cited by the Examiner

UNITED STATES PATENTS

| | | | |
|---|---|---|---|
| 1,782,205 | 11/1930 | Kuman | 122—421 |
| 1,917,275 | 7/1933 | Rossman et al. | 122—477 |
| 1,922,663 | 8/1933 | Kemnal | 122—235 |
| 2,199,214 | 4/1940 | Vorkauf | 122—406 |
| 2,704,534 | 3/1955 | Dalin et al. | 122—411 |
| 2,714,877 | 8/1955 | Andrew | 122—510 |

KENNETH W. SPRAGUE, *Primary Examiner.*